United States Patent
Chauhan et al.

(10) Patent No.: US 12,282,417 B2
(45) Date of Patent: *Apr. 22, 2025

(54) RETRYING FAILED TEST CASES IN SOFTWARE TESTING USING PARALLEL THREADS

(71) Applicant: State Farm Mutual Automobile Insurance Company, Bloomington, IL (US)

(72) Inventors: Shaktiraj Chauhan, Normal, IL (US); Nate Shepherd, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/336,757

(22) Filed: Jun. 16, 2023

(65) Prior Publication Data

US 2023/0333973 A1  Oct. 19, 2023

Related U.S. Application Data

(63) Continuation of application No. 17/333,637, filed on May 28, 2021, now Pat. No. 11,720,482.

(Continued)

(51) Int. Cl.
  *G06F 11/36* (2006.01)
  *G06F 11/3668* (2025.01)
  *G06N 20/00* (2019.01)

(52) U.S. Cl.
  CPC ...... *G06F 11/3688* (2013.01); *G06F 11/3692* (2013.01); *G06F 11/3696* (2013.01); *G06N 20/00* (2019.01)

(58) Field of Classification Search
  CPC ............ G06F 11/3688; G06F 11/3692; G06F 11/3696; G06N 20/00
  See application file for complete search history.

(56) References Cited

U.S. PATENT DOCUMENTS 6,330,528 B1  12/2001  Huang et al.
7,178,063 B1  2/2007  Smith
(Continued)

OTHER PUBLICATIONS

Office Action for U.S. Appl. No. 17/333,894, mailed on Nov. 27, 2023, Shaktiraj Chauhan, "Parallel Software Testing Based on Annotations", 21 pages.

(Continued)

*Primary Examiner* — Wei Y Zhen
*Assistant Examiner* — Brahim Bourzik
(74) *Attorney, Agent, or Firm* — Lee & Hayes, P.C.

(57) ABSTRACT

Test cases written to test a software application can be dynamically distributed among different sets of test cases that can be executed simultaneously in different parallel threads, thereby speeding up testing relative to executing the test cases sequentially in a single thread. Although executing the test cases in parallel threads can cause the test cases to execute in a different order than intended by developers, any test cases that fail due to database conflicts or other errors as a result of the parallelization can be retried at least once. Re-executing failed test cases at a later time can lead to the full set of test cases ultimately succeeding, despite errors that may have been caused by the parallelization.

20 Claims, 4 Drawing Sheets

Related U.S. Application Data

(60) Provisional application No. 63/152,754, filed on Feb. 23, 2021.

(56) References Cited

U.S. PATENT DOCUMENTS

| | | | |
|---|---|---|---|
| 7,506,312 | B1* | 3/2009 | Girolami-Rose ... G06F 11/3688 717/124 |
| 8,028,276 | B1 | 9/2011 | Bessonov |
| 8,281,187 | B1 | 10/2012 | Desai et al. |
| 8,549,522 | B1 | 10/2013 | Chatterjee et al. |
| 8,639,983 | B1 | 1/2014 | Desai et al. |
| 9,009,823 | B1 | 4/2015 | Ismael et al. |
| 9,032,373 | B1 | 5/2015 | Gupta et al. |
| 10,067,858 | B2 | 9/2018 | McDonald |
| 10,387,295 | B1 | 8/2019 | Kesarwani |
| 10,430,319 | B1 | 10/2019 | Tokappa et al. |
| 10,628,394 | B1 | 4/2020 | Gurspan |
| 11,080,171 | B2 | 8/2021 | Venkataraman et al. |
| 11,537,575 | B1 | 12/2022 | McNair et al. |
| 11,537,616 | B1 | 12/2022 | Lin |
| 2002/0116507 | A1 | 8/2002 | Manjure et al. |
| 2003/0208351 | A1 | 11/2003 | Hartman et al. |
| 2005/0120276 | A1 | 6/2005 | Kolawa |
| 2005/0251719 | A1 | 11/2005 | Gerber |
| 2006/0212412 | A1 | 9/2006 | Sapir |
| 2007/0226691 | A1 | 9/2007 | Happell et al. |
| 2007/0271483 | A1 | 11/2007 | Kolawa et al. |
| 2009/0144706 | A1 | 6/2009 | Pastorelli |
| 2009/0187366 | A1 | 7/2009 | Day et al. |
| 2009/0259699 | A1 | 10/2009 | Chasman et al. |
| 2009/0307763 | A1* | 12/2009 | Rawlins ............ G06F 11/3692 714/E11.002 |
| 2010/0100871 | A1 | 4/2010 | Celeskey |
| 2011/0246540 | A1 | 10/2011 | Salman et al. |
| 2012/0023373 | A1 | 1/2012 | Chen |
| 2012/0151455 | A1 | 6/2012 | Tsantilis et al. |
| 2013/0047141 | A1* | 2/2013 | Shann ................ G06F 11/3664 717/127 |
| 2014/0359581 | A1 | 12/2014 | Soshin |
| 2016/0026562 | A1 | 1/2016 | Hwang et al. |
| 2016/0041543 | A1 | 2/2016 | Monczynski et al. |
| 2016/0162392 | A1* | 6/2016 | Hu ..................... G06F 11/3688 714/38.1 |
| 2016/0246575 | A1 | 8/2016 | Baluch et al. |
| 2017/0109257 | A1* | 4/2017 | Li ...................... G06F 11/3688 |
| 2018/0113798 | A1 | 4/2018 | Johnston et al. |
| 2018/0113799 | A1 | 4/2018 | M.V. et al. |
| 2018/0121339 | A1 | 5/2018 | Mayers et al. |
| 2018/0173606 | A1 | 6/2018 | Malla et al. |
| 2019/0087311 | A1* | 3/2019 | Donaldson .......... G06F 11/3688 |
| 2019/0129833 | A1 | 5/2019 | Lv et al. |
| 2019/0294531 | A1* | 9/2019 | Avisror ............... G06F 11/3692 |
| 2019/0332523 | A1* | 10/2019 | Gefen ................ G06F 11/3688 |
| 2020/0065235 | A1 | 2/2020 | Li |
| 2020/0125485 | A1 | 4/2020 | Wiener et al. |
| 2020/0174907 | A1 | 6/2020 | Lundquist et al. |
| 2020/0210170 | A1 | 7/2020 | Johnson |
| 2020/0310860 | A1 | 10/2020 | Arumugam et al. |
| 2020/0349062 | A1* | 11/2020 | Coleman ............ G06F 11/3688 |
| 2021/0109848 | A1 | 4/2021 | Leon |
| 2021/0174228 | A1 | 6/2021 | Gokarn et al. |
| 2021/0286710 | A1 | 9/2021 | Hicks et al. |
| 2021/0288925 | A1 | 9/2021 | Tagra |
| 2023/0090033 | A1 | 3/2023 | Chauhan |
| 2023/0333972 | A1 | 10/2023 | Shaktiraj |
| 2023/0333973 | A1 | 10/2023 | Shaktiraj |

OTHER PUBLICATIONS

Shrivathsan, et al., "Novel Fuzzy Clustering Methods for Test Case Prioritization in Software Projects." Symmetry, vol. 11, No. 1400, 2019, 22 pages.

Office Action for U.S. Appl. No. 17/333,894, mailed on Aug. 1, 2023, Shaktiraj Chauhan, "Parallel Software Testing Based on Annotations", 19 pages.

Rauf, et al., "Ontology Driven Semantic Annotation Based GUI Testing", 2010 6th International Conference on Emerging Technologies, IEEE, 2010, pp. 261-264.

DiGiuseppe, "Automatically Describing Software Faults". Proceedings of the 2013 9th Joint Metting on the Foundations of Software Engineering, 2013, 4 pgs.

Haftmann, et al., "Parellel Execution of Test Runs for Database Application Systems" Proceedings of the 31st VLDB Conference, 2005, 12 pgs.

Office Action for U.S. Appl. No. 17/333,739, mailed on Jan. 12, 2023, Chauhan, "Software Testing in Parallel With Different Database Instances", 12 pages.

Office Action for U.S. Appl. No. 17/333,894, mailed on Jan. 6, 2023, Chauhan, "Parallel Software Testing Based on Annotations", 18 pages.

Office Action for U.S. Appl. No. 17/333,989, mailed on Nov. 18, 2022, Chauhan, "Test Conflict Guard for Parallel Software Testing", 33 Pages.

Office Action for U.S. Appl. No. 17/333,637, mailed on Dec. 20, 2022, Chauhan, "Retrying Failed Test Cases in Software Testing Using Parallel Threads", 22 Pages.

Office Action for U.S. Appl. No. 17/333,989, mailed on Apr. 4, 2023, Chauhan, "Test Conflict Guard for Parallel Software Testing", 37 Pages.

Office Action for U.S. Appl. No. 17/333,637, mailed on Jun. 15, 2022, Chauhan "Retrying Failed Test Cases in Software Testing Using Parallel Threads", 18 pages.

Office Action for U.S. Appl. No. 17/333,535, mailed on Jun. 20, 2022, Chauhan, "Software Testing in Parallel Threads With a Record-Locking Database", 6 pages.

Office Action for U.S. Appl. No. 17/333,739, mailed Aug. 4, 2022, Chauhan, "Software Testing in Parallel With Different Database Instances", 12 pages.

Qusef, "Recovering test-to-code traceability using slicing and textual analysis", Journal of Systems and Software 88 2014, pp. 147-168.

Office Action for U.S. Appl. No. 18/070,120, mailed on Jun. 16, 2023, Chauhan, "Software Testing in Parallel Threads With a Record-Locking Database", 7 Pages.

Willemsen, "Improving diagnosis by Grouping Test Cases to Reduce Complexity", MS thesis, University of Twente, 2018, 93 pgs.

Office Action for U.S. Appl. No. 18/482,772, mailed on May 22, 2024, Chauhan, "Test Conflict Guard for Parallel Software Testing", 30 pages.

Office Action for U.S. Appl. No. 18/334,786, Dated Jul. 16, 2024, 6 pages.

Office Action for U.S. Appl. No. 17/333,894, Dated Jul. 26, 2024, 20 pages.

Office Action for U.S. Appl. No. 18/482,772, dated Sep. 10, 2024, 32 pages.

* cited by examiner

RETRYING FAILED TEST CASES IN SOFTWARE TESTING USING PARALLEL THREADS

RELATED APPLICATIONS

This U.S. Patent Application is a continuation of, and claims priority to, U.S. patent application Ser. No. 17/333,637, filed on May 28, 2021, which claims priority to provisional U.S. Patent Application No. 63/152,754, entitled "RETRYING FAILED TEST CASES IN SOFTWARE TESTING USING PARALLEL THREADS," filed on Feb. 23, 2021, the entirety of which is incorporated herein by reference.

TECHNICAL FIELD

The present disclosure relates to software development, particularly with respect to systems and methods for retrying failed tests when using parallel threads to perform unit and integration testing.

BACKGROUND

During development of a software application, software developers can prepare tests to verify that the software application operates as expected. Such tests may be associated with unit testing that tests the functionality of a relatively small piece of code, and/or integration testing that tests how multiple pieces of code interact. Because individual tests may be designed to test one or more relatively small aspects of the overall software application, software developers may create numerous tests associated with the entire software application.

Some tests associated with the software application may build on one another. For instance, a first test may create a record in a database, and a second test may be designed to further access or edit the database record created by the first test. In this situation, a developer may write code for the second test under the assumption that the first test will already have executed and created the record in the database by the time the second test executes. Accordingly, in this situation, the second test may be dependent on data created by the first test.

In some situations, when a new version of the software application is tested, it can take a relatively long period of time to execute all of the tests and verify that the new version of the software application successfully passes all of the tests. For instance, tests can be written to build on each other in a sequential order as discussed above, and running a large set of tests in a sequence can take a relatively long period of time. As a non-limiting example, tests for a software application may be written in a set of 7000 class files that each include numerous functions, and it may take up to two hours to sequentially execute all of the tests in the 7000 class files.

The time it takes to sequentially execute a large set of tests can pose challenges and introduce delays during software development, particularly in situations in which multiple developers are working on the same software application. As an example, a team of software developers may generate sixty new builds of the software application in a single day. If each build is tested using a set of 7000 class files that takes up to 120 minutes of server time to execute, the testing may take up to 7200 minutes of server time in a single day.

As another example, two developers may check out code from a main code branch and independently make changes to the code for the software application. If the first developer submits updated code for testing, it may take two hours to run a full set of test cases on the first developer's updated code. However, by the time the testing verifies that the first developer's changes have passed the full set of test cases and can be incorporated back into the main code branch, the second developer may separately have submitted different code changes for testing. The code changes made by the second developer may be incompatible with the changes made by the first developer. Accordingly, even if the second developer's changes also independently pass the full set of test cases, it may not be possible to incorporate those changes back into the main code branch due to incompatible changes already made by the first developer. If testing of the first developer's code changes had been performed more quickly, the second developer could have been made aware of the first developer's changes and accounted for them before the second developer submitted additional code changes for testing.

Accordingly, it can be desirable to run a full set of tests on updated code for a software application more quickly than described above. One possibility for speeding up the testing process is to run different tests in parallel at the same time. For example, rather than running tests within a full set of 7000 class files in sequence, the tests can be divided into smaller sets that can be run simultaneously in two or more parallel threads. Although executing the full set of tests in sequence may take up to two hours, running different subsets of the tests simultaneously in parallel threads may allow the full set of tests to complete in 30 minutes or less. Developers can thus be notified whether their code changes pass the full set of tests more quickly, and allow code changes that have passed the full set of tests to be merged into a main code branch more quickly. In addition to executing a full set of tests more quickly for a single new build of a software application, running tests in parallel threads can also reduce overall usage of server time when multiple new builds of the software application are tested. For instance, if testing each build of a software application takes up to 120 minutes when tests are executed sequentially in a single thread, it can take up to 7200 minutes of server time to test sixty different builds in a day. If running the tests in parallel reduces the testing time for each build down to 30 minutes as discussed above, testing sixty builds in a day may instead take only 1800 minutes of server time. However, although executing tests in parallel can speed up testing of a software application, in some cases the parallelization itself can cause errors and/or failed tests during testing.

For example, as discussed above, tests may be written under the assumption that the tests will build on one another in a sequential order. Code changes may pass such tests if the tests are indeed executed sequentially in the originally intended order. However, the same code changes may not pass the same tests if the tests are executed out of order, for instance because related or dependent tests are executed out of order in different parallel threads.

As an example, multiple tests may attempt to access the same table of a database. The database may be configured to at least briefly lock the table when the table is accessed by a code element, such that the database table cannot be changed by other code elements while the table is locked. If a set of tests are run sequentially in an intended order, a first test may have finished accessing a database table, and the table can thus be unlocked, by the time a second test later attempts to access the database table. The second test may succeed in this scenario due to the unlocked database table. However, if the tests are instead run in parallel as described above, there is a chance that different tests, executing simultaneously in different parallel threads, may attempt to access the same database table at essentially the same time. This can cause database conflicts, table locking errors, application or service errors, and/or failure of one or more of the tests. For instance, if a database table is locked due to a first test accessing the database table, the table may still be locked if a second test, executing in parallel with the first test, also attempts to access the database table. The database table locking can thus cause the second test to fail, even though the second test may have succeeded if it had been executed at a different time when the database table was not locked due to another test executing in parallel.

As another example, tests may be written such that a first test creates data in a database, and a second test accesses or edits the data that the first test created. If these two tests are executed in sequence, the first test can have successfully created the data in the database by the time the second test attempts to access that data in the database. However, if the tests are instead run in parallel, there is a chance that the second test will execute in one parallel thread earlier than the first test executes in another parallel thread. Accordingly, if the second test executes earlier than the first test due to parallelization, the second test may fail because database data used in the second test has not yet been created by the first test.

The example systems and methods described herein may be directed toward mitigating or overcoming one or more of the deficiencies described above.

SUMMARY

Described herein are systems and methods for testing a software application using a set of test cases distributed among in parallel threads, including re-executing any test cases that initially fail. Database errors may occur because related test cases execute in different parallel threads in a different order than they would have been executed in a single thread. Such database errors caused by the parallel execution of test cases may cause individual test cases to fail, even if the test cases would have succeeded if executed sequentially in a single thread. However, failed test cases can be tracked and re-executed. Re-executing such failed test cases can increase the chances that the overall set of test cases ultimately succeeds, as many test failures caused by the parallelization itself may not reoccur when the test cases are re-executed at a different time.

According to a first aspect, a computer-implemented method can include identifying, by one or more processors of a computing device, a plurality of test cases that test interactions between a software application and a database. The method can also include distributing, by the one or more processors, individual test cases of the plurality of test cases among a plurality of parallel threads on the computing device, and executing, by the one or more processors, the plurality of test cases in the plurality of parallel threads. The method can further include determining, by the one or more processors, one or more failed test cases of the plurality of test cases based on the executing. The method can also include generating, by the one or more processors, at least one test failure log. The at least one test failure log can indicate the one or more failed test cases and failure codes corresponding to the one or more failed test cases. The method can also include re-executing, by the one or more processors, the one or more failed test cases. The method can additionally include collecting, by the one or more processors, a plurality of test results associated with the test cases distributed to the plurality of parallel threads. The plurality of test results can indicate whether the plurality of test cases ultimately succeeded during at least one of the executing or the re-executing. The method can also include aggregating, by the one or more processors, the plurality of test results.

According to a second aspect, a computing device can include one or more processors and memory storing computer-executable instructions that, when executed by the one or more processors, cause the one or more computing devices to perform operations. The operations can include identifying a plurality of test cases that test interactions between a software application and a database, distributing individual test cases of the plurality of test cases among a plurality of parallel threads on the computing device, and executing the plurality of test cases in the plurality of parallel threads. The operations can also include determining one or more failed test cases of the plurality of test cases based on the executing, identifying failure codes associated with the one or more failed test cases, and re-executing the one or more failed test cases based on the failure codes. The operations can also include aggregating test results associated with the executing and the re-executing.

According to a third aspect, one or more non-transitory computer-readable media can store computer-executable instructions that, when executed by one or more processors, cause the one or more processors to perform operations. The operations can include identifying a plurality of test cases that test interactions between a software application and a database, distributing individual test cases of the plurality of test cases among a plurality of test sets, and executing different test sets of the plurality of test sets simultaneously in different parallel threads. The operations can also include determining one or more failed test cases of the plurality of test cases based on the executing, generating least one test failure log indicating the one or more failed test cases and failure codes corresponding to the one or more failed test cases, and re-executing the one or more failed test cases. The operations can further include determining whether the plurality of test cases ultimately succeeded, by aggregating a plurality of test results associated with the executing and the re-executing.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
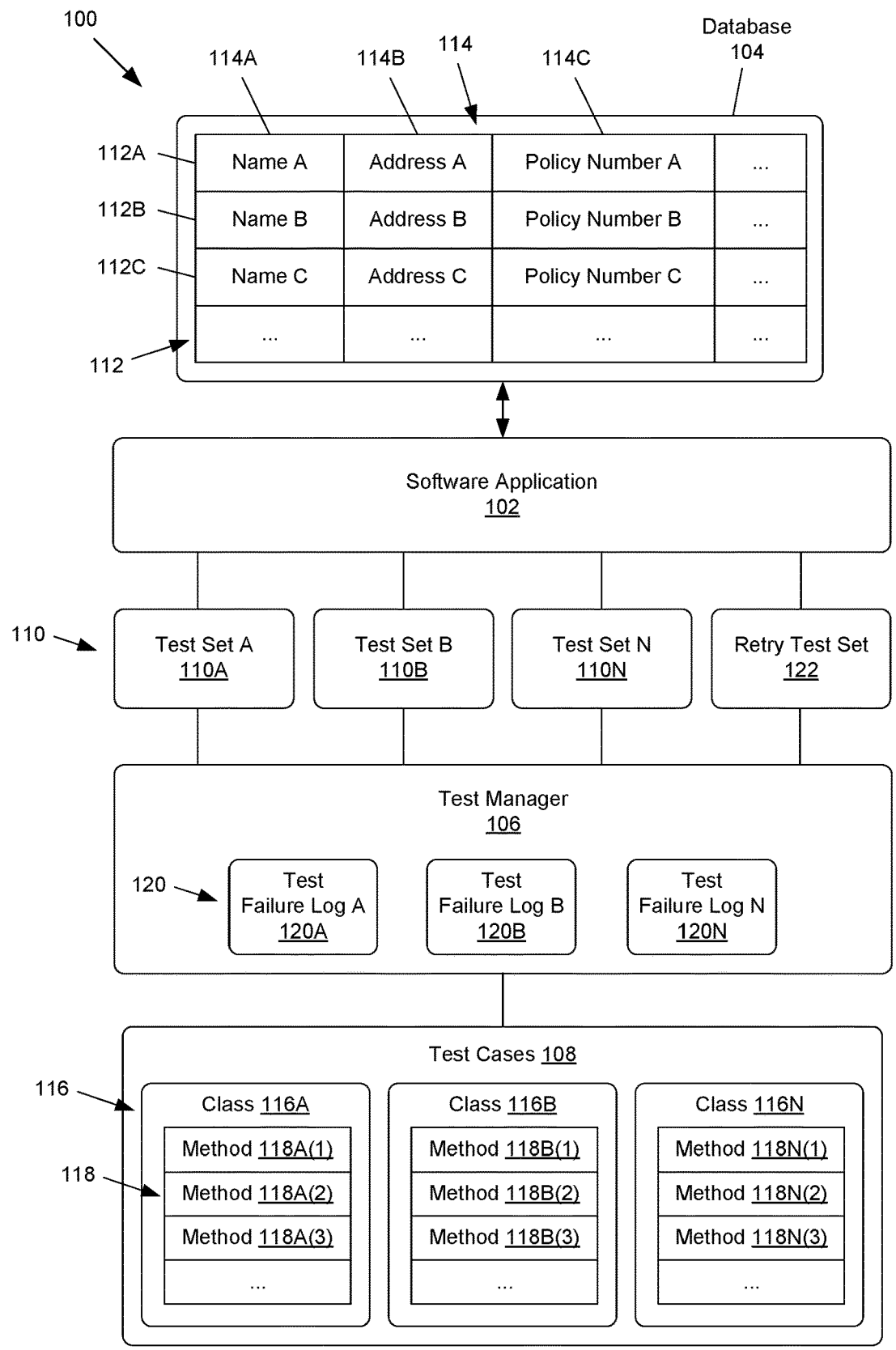
FIG. 1 shows an example of a system for testing a software application that operates in association with a database.

FIG. 1 shows an example of a system 100 for testing a software application 102 that operates in association with a database 104. In particular, the system 100 can include a test manager 106 that distributes code for a set of test cases 108 among different test sets 110 associated with different parallel threads on a computing device. The test manager 106 can cause the test cases 108 in the test sets 110 to execute, substantially simultaneously, in the parallel threads on the computing device in association with one or more instances of the software application 102. Accordingly, executing the test cases 108 in parallel threads can increase the speeds at which the test cases 108 can be executed, relative to executing the test cases 108 in sequence in a single thread.

The software application 102 can be a software program comprising computer-executable instructions associated with one or more functions. As a non-limiting example, the software application 102 can be an insurance policy management system that manages insurance policies by enabling creation, renewal, and/or termination of insurance policies associated with an insurance company, enabling users associated with the insurance company to view and/or edit information about insurance policies, and/or performing other tasks associated with management of insurance policies. In this example, information about insurance policies can be stored in the database 104, such that the software application 102 can access and/or edit information about the insurance policies in the database 104. In other examples, the software application 102 can be a billing and payment system, a customer management system, an order tracking system, an electronic commerce system, a database management system, or any other type of software that operates at least in part based on data stored in the database 104.

The software application 102 can be a compiled and/or executable version of code written in a programming language such as Gosu®, Java®, C++, C#, Python®, or any other programming language. For instance, in examples in which code for the software application 102 is written using Gosu® or Java®, the code can be compiled into an executable and/or deployable file, such as a web application archive (WAR) file or a Java® archive (JAR) file.

Over time, software developers can write new and/or updated code to create new and updated versions of the software application 102. For example, software developers may write new and/or updated code to implement new features of the software application 102, update or enhance existing features of the software application 102, update the software application 102 to communicate with other software applications, or for any other reason. As a non-limiting example, if the software application 102 is the insurance policy management system described above, software developers may write new code to integrate the insurance policy management system with a separate billing system, a separate customer management system, and/or other separate systems or applications.

The database 104 can be a relational database, non-relational database, object-oriented database, network database, hierarchical database, a flat file or other flat structured data storage element, or any other type of database or data storage element that stores records. In some examples, the database 104 may organize data into one or more tables that each have rows and columns. However, in other examples, the database 104 may store data in other formats without the use of tables.

The database 104 can contain any number of records 112A, 112B, 112C, etc. (referred to collectively herein as "records 112") having any number of attributes 114A, 114B, 114C, etc. (referred to collectively herein as "attributes 114"). In some examples, different records 112 can be represented as different rows of a table, while different attributes 114 of the records 112 can be represented as different columns of the table. In other examples, different records 112 can be represented in the database 104 without the use of rows and columns, or tables.

FIG. 1 shows a non-limiting example in which records 112 in the database 104, including a first record 112A, a second record 112B, and a third record 112C, are associated with insurance policies. These example records 112 can each include attributes 114, such a name attribute 114A, an address attribute 114B, a policy number attribute 114C, and/or other types of attributes 114. In other examples, records 112 and their attributes 114 can be associated with any other type of data, such as customer information, order information, billing information, or any other data.

Data in the database 104 can be accessed or changed using a query language, such as the Structured Query Language (SQL), and/or other types of commands or input. For example, the software application 102 may use SQL queries or other commands to add new records 112, edit existing records 112, delete records 112, retrieve one or more attributes 114 of one or more records 112, and/or otherwise interact with the database 104.

In some examples, the software application 102 can be tightly coupled with the database 104. For example, when software application 102 executes, software application 102 can create the database 104 as a tightly coupled database, such that the database 104 can store data used by the software application 102 during execution of the software application 102. In other examples, the software application 102 can be loosely coupled with the database 104. For instance, the database 104 can be initiated and/or maintained separately from the software application 102.

In some examples, the database 104 can be an in-memory database that stores data in random-access memory (RAM) or other volatile memory of a computing device. For instance, the database 104 can be instantiated as an in-memory database when the software application 102 is loaded or instantiated in memory. As an example, when the software application 102 is loaded into memory by a computing device for execution, the software application 102 may create a new instance of the database 104 as an in-memory database by defining one or more columns of one of more tables, or by otherwise instantiating the database 104. Thereafter, the software application 102 can add records 112 to the database 104, or otherwise access the database 104, after the in-memory database has been instantiated. For example, records 112 in the database 104 can be accessed based on test cases 108 in one or more test sets 110 that are executed in association with the software application 102 and the database 104, as discussed further below. In other examples, the database 104 can stored in persistent memory such as hard disk drives, solid-state drives, or other non-volatile memory. In various examples, the database 104 can be an "H2mem" database, a "Postgres" database, or any other type of database.

In some examples, the database 104 can be a table-locking database. A table-locking database can be configured to at least briefly lock a table of the database, including all of the records 112 of that table, when any record in the table is accessed. For example, when a first software element accesses a record of a table, the table-locking database may lock the entire table such that other software elements are prevented from accessing or editing any data in the table while the first software element is accessing the table. As a non-limiting example, the database 104 can be an "H2mem" in-memory database with an "MVStore" engine that is configured to at least briefly lock an entire database table when the table is accessed.

In other examples, the database 104 can be a record-locking database. A record-locking database can be configured to at least briefly lock individual records 112 in the database 104 when such records 112 are accessed, instead of locking an entire table, another data structure larger than an individual record, or the entire database 104. As a non-limiting example, the database 104 can be an "H2mem" in-memory database that uses Multi-Version Concurrency Control (MVCC) to set database locks at a record level. In some examples, a record-locking database can permit software elements to simultaneously access different records 112 of the same database. For example, when the database 104 is a record-locking database, different methods 118 of different test sets 110 executing in different parallel threads can access different records 112 in the database 104 simultaneously.

In still other examples, the database 104 can be any other type of database that does or does not use tables. For example, the database 104 may be a non-relational database or flat file that stores records 112 without the use of tables.

Software developers can write code to test the functionality of new or existing versions of the software application 102. For example, one or more software developers can create the set of test cases 108 for unit testing and/or integration testing of the software application 102. The test cases 108 can be designed to verify whether a new or existing version of the software application 102 passes the set of test cases 108 and operates as intended by the software developers. The test cases 108 can test various scenarios regarding how the software application 102 can interact with the database 104. For instance, the test cases 108 may test whether the software application 102 can access the database 104, can access particular tables of the database 104, and/or can access particular records 112 in the database 104.

In some examples, there may be a relatively large number of test cases 108 in part due to regulatory requirements, state laws, business requirements, rules, and/or other factors. For instance, when the software application 102 is a policy management system that manages insurance policies, different states or jurisdictions may have different laws that impact how such insurance policies are to be managed. Accordingly, the set of test cases 108 can include one set of tests that attempt to verify that the software application 102 can successfully manage insurance policies according to the rules of one jurisdiction, as well as another set of tests that attempt to verify that the software application 102 can also successfully manage insurance policies according to the rules of another jurisdiction.

Code for the test cases 108 can be expressed in one or more classes 116A, 116B, . . . 116N, etc. (referred to collectively herein as "classes 116"). Each of the classes 116 can include one or more methods 118. For example, different classes 116 can be associated with different class files, each of which includes code for one or more methods 118. Individual methods 118 can set up data in the database 104 for tests, test functionality associated with the software application 102, output test results, or perform any other operation associated with testing of the software application.

Each method in a class may be a function, such as a function written in Gosu®, Java®, or another programming language. As an example, a file for a class can be a .gs file containing Gosu® code for one or more methods 118. The test cases 108 can include any number of files for classes 116, such as class 116A, class 116B, . . . and class 116N, as shown in FIG. 1. For example, class 116A can include methods 118A(1), 118A(2), 118A(3), etc. Different class files can include the same or a different amount of methods 118.

As will be discussed further below, some of the classes 116 and/or methods 118 may be related or dependent on one another. For example, a software developer may have written a test case that depends on, or builds on, operations the developer assumed another related test case would already have performed. As another example, a test case may be designed to use or edit data in the database 104 that a software developer assumed another related test case would already have created. As still another example, different test cases may be configured to access the same data in the database 104.

The system 100 for testing the software application 102 can include the test manager 106. The test manager 106 can be an executable software component or script that is configured to manage the execution of the test cases 108, including classes 116 and/or methods 118, with respect to the software application 102. In some examples, the test manager 106 can be associated with a build automation tool, such as Gradle®, that can build new versions of the software application 102, initialize an execution environment for the software application 102, and/or define tasks to be executed with respect to the software application 102. For example, the test manager 106 may create one or more Gradle® executors, or other scripts, code, configurations, or computer-executable instructions that cause one or more instances of the software application 102 to execute test cases 108 of different test sets 110 in association with the database 104, or otherwise cause the different test sets 110 to be executed in association with the database 104.

The test manager 106 can be configured to distribute the test cases 108 among different test sets 110. For example, as shown in FIG. 1, the test manager 106 can distribute the test cases 108 into any number of test sets 110A, 110B, . . . 110N, etc. (referred to collectively herein as "test sets 110"). In some examples, the test manager 106 can obtain a list object, or other data, that identifies individual test cases 108. The test manager 106 can then distribute the individual test cases 108 among the different test sets 110 at a class level and/or a method level, as discussed further below.

In some examples, the test manager 106 can distribute test cases 108 to test sets 110 at a class level. In these examples, the test manager 106 can distribute all of the methods 118 of a particular class to the same test set 110, and may distribute methods 118 from other classes 116 to the same test set or other test sets 110. As a non-limiting example, the test manager 106 may assign the methods 118A of class 116A to the first test set 110A, and the methods 118B of class 116B to the second test set 110B. As another non-limiting example, the test manager 106 may assign the methods 118A of class 116A, and the methods 118B of class 116B, to the first test set 110A, and assign methods of other classes 116 to other test sets 110.

In some examples, the test manager 106 can also, or alternately, distribute test cases 108 to test sets 110 at a method level. In these examples, the test manager 106 can distribute subsets of the methods 118 of the same class among different test sets 110. As a non-limiting example, the test manager 106 may assign methods 118A(1) and 118A(2) of class 116A to the first test set 110A, but assign method 118A(3) of class 116A to the second test set 110B. In some examples, the test manager 106 may also allocate subsets of methods 118 from different classes 116 to the same test set when distributing test cases at a method level. As a non-limiting example, the test manager 106 may assign method 118A(3) of class 116A to the second test set 110B, and also assign method 118B(3) to the second test set 110B.

In some cases, the test manager 106 may dynamically distribute an equal number of test cases 108 to different test sets 110. In other cases, the test manager 106 may dynamically distribute an unequal number of test cases 108 to different test sets 110, for instance based on predicted execution times or other factors.

As a first non-limiting example of distributing an unequal number of test cases 108 to different test sets 110, the test manager 106 may determine that a set of five hundred methods from a first class is expected to take approximately five minutes to execute. However, the test manager 106 may determine that a second class and a third class each have only two hundred methods, and that together the four hundred methods of the second class and the third class may also take approximately five minutes to execute. Accordingly, the test manager 106 may assign the five hundred methods from the first class to a first test set, and assign the four hundred methods from the second class and the third class to a second test set. This may eliminate or reduce idle processor cycles or server time, relative to assigning each of the three classes to different test sets and waiting for the four hundred methods of the first class to complete after the two hundred methods of the second class and the third class have each completed separately in other parallel threads.

As a second non-limiting example of distributing an unequal number of test cases 108 to different test sets 110, the test manager 106 may determine that a first subset of three hundred test cases 108 is expected to take approximately five minutes to execute, and may determine that a second subset of one thousand other test cases 108 is also expected to take approximately five minutes to execute. Accordingly, the test manager 106 may assign the first subset of the three hundred test cases 108 to a first test set, and assign the second subset of one thousand test cases 108 to a second test set, such that both test sets are expected to take approximately the same amount of time to execute despite differing numbers of test cases in the two test sets.

The test manager 106 can also be configured to cause different test sets 110 to execute simultaneously, in parallel, in association with the software application 102 and the database 104. For example, a computing device can initiate a first instance of the software application 102 in a first parallel thread, and also initiate a second instance of the software application 102 in a second parallel thread. The computing device can accordingly execute a first set of methods 118 assigned to the first test set 110A in the first parallel thread in association with the database 104, and simultaneously execute a second set of methods 118 assigned to the second test set 110B in the second parallel thread in association with the database 104. Methods 118 assigned to a test set may execute in sequence with respect to other methods 118 within the same test set 110, however the computing device can execute different methods 118 associated with different test sets 110 in different parallel threads at substantially the same time. The test manager 106 may also collect test results associated with the methods and/or classes of different test sets 110 that execute in different parallel threads, and combine the test results into an aggregated test result report, for example as discussed below with respect to FIG. 2.

The computing device can use virtual machines, hyper-threading, parallel threads, and/or any other type of parallelization to execute test cases 108 of different test sets 110 in parallel at substantially the same time. The computing device can set up and use any number of parallel threads, depending on the memory, processing power, and/or other computing resources available to the computing device. For example, the computing device can be a server that has 128 GB of memory and 16 CPUs. In this example, if different instances of the software application 102 each use approximately 15 GB of memory when executed via virtual machines, the computing device may initialize eight parallel threads that are each allocated 16 GB of memory. The test manager 106 can accordingly distribute the test cases 108 among eight test sets 110 that correspond to the eight parallel threads.

In some examples, the test manager 106 can use a Java® concurrent "ExecutorService," or other system, to initialize a fixed number of parallel threads in a thread pool, distribute the methods 118 of the test cases 108 among different test sets 110 associated with different initialized parallel threads, and use one or more callable objects to execute the methods 118 of the different test sets 110 in association with the parallel threads. In some examples, the test manager 106 can use tasks or scripts associated with a build automation tool, such as Gradle®, to distribute the methods among test sets 110 and to cause execution of the test sets 110 in parallel. For example, the test manager 106 can use Gradle® tasks or other scripts to dynamically set up different executors associated with the software application 102 in different parallel threads, distribute methods 118 of the test cases 108 among different test sets 110 associated with the parallel threads at a class level and/or a method level, cause the different executors to execute the methods 118 of the test sets 110 in parallel, and/or to combine corresponding sets of test results into an aggregated test result report.

As a non-limiting example, if the test cases 108 contain seven thousand classes 116, the test manager 106 may divide the seven thousand classes 116, at a class level, into seven different test sets 110 that each contain methods 118 aggregated from a different set of approximately one thousand classes 116. Each of these seven test sets 110 can be associated with a different thread of a pool of seven parallel threads. The test manager 106 can cause the seven test sets 110 to be executed in parallel, substantially simultaneously, via the seven different parallel threads. Accordingly, the full set of seven thousand classes 116 may execute in parallel more quickly than the seven thousand classes 116 could execute in sequence in a single thread. Executing the classes 116 in parallel can also reduce server time or usages of other computing resources, relative to executing the classes 116 in a single thread.

As another non-limiting example, if a particular class includes a set of one hundred methods 118, the test manager 106 may divide those one hundred methods 118, at a method level, into multiple test sets 110 that can be executed simultaneously in parallel threads. Accordingly, the full set of one hundred methods 118 can execute in parallel more quickly than executing the full set of one hundred methods 118 in sequence in a single thread. Executing the methods 118 in parallel can also reduce server time or usages of other computing resources, relative to executing the methods 118 in a single thread.

Although the test manager 106 may distribute classes 116 and/or methods 118 of the test cases 108 among multiple test sets 110, and cause the test sets 110 to execute in parallel, the test cases 108 may not have been written by software developers with parallelization in mind. For example, the test cases 108 may have been written by software developers under the assumption that the classes 116 and/or methods 118, including related or dependent classes 116 and/or methods 118, would be executed sequentially in a particular intended order in a single thread. For instance, a developer may have written a test case that depends on, or builds on, operations the developer assumed another related test case would already have performed.

However, because the test manager 106 may distribute test cases 108 into different test sets 110 that execute in parallel, there is a chance that the developers' assumptions about the execution order of test cases 108 may be incorrect. In some cases, executing classes 116 and/or methods 118 in parallel threads, as part of different test sets 110, may cause errors that lead to test failures when the classes 116 and/or methods 118 execute in a different order than the developers' originally intended execution order.

As a first example, parallel execution of the test cases 108 may lead to missing data errors associated with the database 104. For example, developers may have written a first test case that attempts to create a particular record in the database 104. The developers may also have written a second test case that attempts to access or edit that particular record. The second test case may have been written under the assumption that, by the time the second test case executes and attempts to access the particular record, the first test case will already have executed and created the particular record in the database 104. However, if these two test cases are instead run in parallel as part of different test sets 110, there is a chance that the second test case may execute in one parallel thread earlier than the first test case executes in another parallel thread. Accordingly, if the parallelization causes the second test case to execute earlier than the first test case, the second test case may fail because it attempts to access a record that does not yet exist because the first test case has not executed yet.

As a second example, parallel execution of the test cases 108 may lead to database conflict errors. For example, two test cases 108 may attempt to access the same table in the database 104, and/or the same record in the database 104. The two test cases 108 may have been written under the assumption that, in the intended execution order, the test cases 108 would execute at different times and thus access the same table and/or record at different times. However, there is a chance that if the two test cases 108 are assigned to different test sets 110, the two test cases 108 may execute in different parallel threads substantially simultaneously. Accordingly, the two test cases 108 may attempt to access the same table and/or record substantially simultaneously, and corresponding database conflicts may cause one or both of the test cases 108 to fail. For instance, if the database 104 is a table-locking database, the first test case to execute in a first parallel thread may access a record of a database table, and thereby cause the entire table to be locked in the database 104. The second test case may execute in a second parallel thread while the table is still locked after being accessed by the first test case. Accordingly, the second test case may fail because it is unable to access data in the locked table. If the database 104 is instead a record-locking database, a particular record in the database 104 may become locked when accessed by the first test case. If the second test case executes in a different parallel thread and attempts to access that same particular record while the record is locked, the second test case may fail because it is unable to access data in the locked record.

The test manager 106 can maintain one or more test failure logs 120A, 120B, . . . 120N, etc. (referred to collectively herein as "test failure logs 120") that track test failures associated with test cases 108 executed as part of test sets 110 in different parallel threads. A test failure log can identify a list of one or more test cases 108 that failed during execution.

In some examples, the test manager 106 can maintain a different test failure log for each test set. For example, as shown in FIG. 1, the test manager 106 can maintain a first test failure log 120A associated with the first test set 110A, a second test failure log 120B associated with the second test set 110B, and other test failure logs 120 associated with other groups of test cases 108 assigned to other test sets 110. Accordingly, the test manager 106 can maintain different individual test failure logs 120 associated with test sets 110 corresponding to different parallel threads.

In other examples, the test manager 106 may maintain a single test failure log associated with all of the test sets 110 and parallel threads. For example, the single test failure log may identify failed test cases of test set 110A, failed test cases of test set 110B, and/or failed test cases of other test sets.

Each of the test failure logs 120 may identify specific test cases 108, such as specific classes 116 and/or methods 118, that failed during an initial execution attempt in a parallel thread. In some examples, a test failure log may also indicate a failure code for each failed test case that indicates a reason why the test case failed. Failure codes may be alphanumeric characters, integers, text values, or any other type of code or data that indicates a reason why a corresponding test case failed. For example, a failure code may indicate that a test case failed due to a missing data error, due to a database table locking error, due to a database record locking error, due to another database conflict error, due to an application error or service error associated with the software application 102, or due to any other type of error. The test cases 108, the software application 102, and/or the database 104 may be configured to report such failure codes to the test manager 106 if test cases 108 fail during execution, such that the test manager 106 can add an identifier of a failed test case and a corresponding failure code to an associated test failure log.

The test manager 106 can accordingly use one or more test failure logs 120 to track and/or identify a subset of test cases 108, out of the full set of test cases 108, that fail when the full set of test cases 108 is initially executed via different test sets 110 in parallel threads. As a non-limiting example, if the test manager 106 distributes a full set of seven thousand test cases 108 among different test sets 110, a subset of two hundred of those seven thousand test cases 108 may fail. The test manager 106 can identify those two hundred failed test cases 108, and indicate identifiers of the two hundred test cases 108 and/or corresponding failure codes in one or more test failure logs 120.

The test manager 106 can also be configured to cause the failed test cases 108 identified in one or more test failure logs 120 to be re-executed. Because such test cases 108 may have failed because they were executed in a different order than originally intended by developers, retrying failed test cases 108 immediately and/or at a later time may cause some or all of the test cases 108 to succeed. For example, if a test case failed due to a record-locking error or a table-locking error because another test case was already accessing the same record or table of the database 104 when the test case executed initially, that test case may succeed if it is retried when another test case is not already accessing the record or table. As another example, if a test case failed due to a missing data error because the test case attempted to access data in the database 104 that had not yet been created by another related test case, the test case may succeed if it is retried after the other related test case has created that data.

Accordingly, the test manager 106 can assign the subset of failed test cases 108, identified in one or more test failure logs 120, to at least one retry test set 122. The test manager 106 can cause the test cases 108 assigned to one or more retry test sets 122 to be re-executed in association with one or more instances of the software application 102. Each failed test case can be re-executed at least once.

In some examples, the test manager 106 may assign all of the subset of identified failed test cases 108 to a single retry test set 122. The test manager 106 can cause the test cases 108 in the single retry test set 122 to be re-executed in sequence, in a single thread.

In other examples, the test manager 106 can distribute the subset of identified failed test cases 108 among different retry test sets 122 associated with different parallel threads. The test manager 106 may redistribute the identified failed test cases 108 among the different test sets 110 at a class level and/or a method level. The test manager 106 can cause the failed test cases 108 to be re-executed in different parallel threads at substantially the same time, as part of different retry test sets 122.

In some cases, if a failed test case originally executed in a particular parallel thread, the test manager 106 can assign the failed test case to a retry test set 122 that is also associated with that particular parallel thread. Accordingly, failed test cases 108 can be re-executed in the same parallel threads in which they originally executed.

However, in other cases, the test manager 106 can redistribute failed test cases 108 among retry test sets 122 without regard to which parallel threads originally executed the failed test cases 108. Accordingly, a particular failed test case may be re-executed in the same parallel thread in which it originally executed, or in another parallel thread different from the parallel thread in which it originally executed.

The test manager 106 may be configured to determine an execution order for failed test cases 108 assigned to the one or more retry test sets 122. In some examples, the test manager 106 may arrange failed test cases 108 in one or more retry test sets 122 such that the failed test cases 108 are re-executed in an order that corresponds to the developer's originally intended execution order. For example, the test manager 106 may arrange failed methods 118 in a retry test set 122 based on the original structure of a class that contained those methods 118. The test manager 106 may also, or alternatively, arrange failed test cases 108 in retry test sets 122, based on corresponding failure test codes to reduce the likelihood of the same types of test failures reoccurring.

As a non-limiting example, method 118A(2) and method 118A(3) shown in FIG. 1 may have both failed because they were executed simultaneously in different parallel threads, and tried to access a table that was locked at the time in the database 104. Test failure logs 120 may have corresponding failure codes indicating that method 118A(2) and method 118A(3) failed due to table locking errors. The test manager 106 may assign method 118A(2) and method 118A(3) to the same retry test set 122, and arrange the retry test set 122 so that method 118A(2) is re-executed before method 118A(3) according to the original structure of class 116A. In addition, because failure codes indicate that method 118A(2) and method 118A(3) both failed due to table locking errors, arranging these two methods 118 to re-execute in sequence in the same parallel thread can reduce the chances of method 118A(2) and/or method 118A(3) again failing due to table locking errors. For example, even if these two methods 118A access the same table in the database, re-executing them in sequence in the same retry test set 122 may permit method 118A(2) to complete, thereby releasing a lock on the table, before method 118A(3) executes and attempts to access the now-unlocked table.

In other examples, the test manager 106 may use code diagnostic tools to examine the set of identified failed test cases 108, and determine if code of any of the failed test cases 108 reference the same tables, records 112, or attributes 114 in the database. If code for a group of failed test cases 108 reference the same data in the database, the test manager 106 may assign that group of failed test cases 108 to the same retry test set 122 in an order corresponding to the original structure of the classes 116 and/or methods 118. Accordingly, related failed test cases 108 can be re-executed sequentially as part of the same retry test set 122 in the same parallel thread, even if other unrelated failed test cases 108 are assigned to retry test sets 122 associated with other parallel threads.

As discussed above, the test manager 106 can track data about failed test cases in test failure logs 120 and cause all identified failed test cases 108 to be re-executed, either in sequence in a single retry test set 122 or in parallel in multiple retry test set 122. In some examples, the test manager 106 may cause one or more failed test cases 108 to be re-executed at a later point in time, such as after a predetermined delay period or after all test cases 108 have been attempted at least once. However, in some examples, the test manager 106 may be configured to cause re-execution of one or more types of failed test cases 108 substantially immediately upon receipt of an indication that a test case failed. In these examples, the test manager 106 may use failure codes to determine which test cases 108 to retry immediately, and which to hold for later retries.

For example, a particular test case may fail due to a table-locking error or a record-locking error that might not have occurred if the particular test case had been executed at a different moment when relevant data was not locked in the database 104. That particular test case may thus be likely to succeed if re-executed a fraction of a second later, when the table lock or record lock is likely to have been released and would no longer block access to data in the database 104. However, if another test case fails due to a missing data error, it may be unknown when another test case will execute in another parallel thread and add the missing data to the database 104. Accordingly, in some examples, the test manager 106 may be configured to immediately attempt re-execution of failed test cases 108 associated with table-locking errors or record-locking errors, but track information about other failed test cases 108 associated with other types of failure codes in test failure logs 120 for later re-execution in one or more retry test sets 122.

The test manager 106 may retry failed test cases 108 immediately and/or on a delay, and collect test results associated with the retried test cases 108. The test manager 106 may aggregate the results of the retried test cases 108, along with results of test cases 108 that initially succeeded. The aggregated test results may indicate whether all of the test cases 108 ultimately succeeded, either initially or after some test cases 108 were retried. In some examples, if the aggregated test results indicate that a subset of test cases 108 still failed after being retried, the test manager 106 may retry that subset of test cases 108 again. For example, aggregated test results indicating the failure of two or more test cases 108, even after those test cases 108 have been retried once, may indicate that the test cases 108 are related in a previously unknown way. The test manager 106 may determine to retry execution of those test cases 108 again based on the aggregated test results, for instance in sequence as part of a single retry test 122, to determine if the test cases 108 fail again or will succeed when retried again in sequence. After collecting and aggregating results, and/or re-executing test cases based on the aggregated test results, the test manager 106 may output the aggregated test results to indicate whether all of the test cases 108 ultimately succeeded, or whether some test cases 108 still failed.

In some examples, the test manager 106 may use a machine learning model or other artificial intelligence trained on historical data about how methods 118 and/or classes 116 interrelate in previous sets of test cases 108. The test manager 106 can use this machine learning model or other artificial intelligence to identify related test cases 108 within a set of identified failed test cases 108, such as test cases 108 that operate on the same or similar data, are associated with common methods or classes, reference the same variable names, and/or are otherwise related. The machine learning model or other artificial intelligence may also be trained on historical data to learn which types of failure codes indicate that a failed test case is more likely to succeed if re-executed immediately or if it is held for later re-execution, learn to predict an execution order that is most likely to cause failed test cases 108 to succeed upon re-execution, learn to predict which types of test cases 108 should be grouped within the same retry test set 122 for later re-execution, and/or learn to make other predictions about patterns or execution arrangements that are likely to cause failed test cases 108 to succeed when re-executed. The test manager 106 can therefore use the machine learning model or other artificial intelligence to determine when to retry one or more failed test cases 108, identify test cases 108 to assign to the same retry test set 122, determine an execution order for one or more retry test sets 122, and/or make other determinations described herein.

Overall, re-executing failed test cases 108 at least once can increase the chances that the full set of test cases 108 ultimately succeeds. This can reduce instances in which testing of the software application 102 fails due to executing the set of test cases 108 in a different order than originally intended through parallelization, and not by bugs or other errors in the code of the software application 102.

Figure 2:
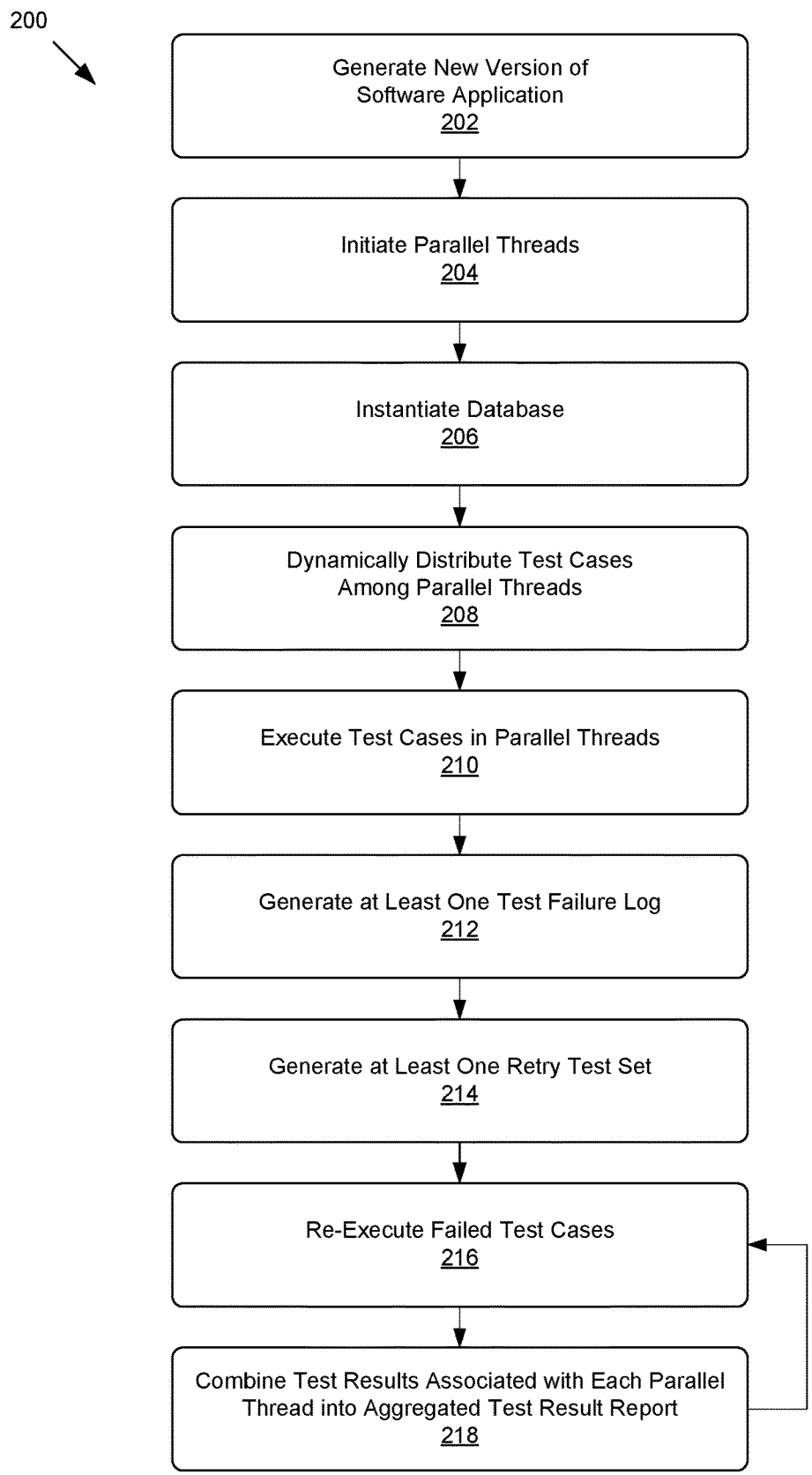
FIG. 2 shows a flowchart of a first example process for generating and testing the software application using parallel threads.

FIG. 2 shows a flowchart of a first example process 200 for generating and testing the software application 102 using parallel threads. At block 202, a computing system can generate a new version of the software application 102. For example, a developer may have written new code, and/or changed existing code, associated with the software application 102 and/or the test cases 108. The developer can submit the new code to a compiler or code management system, and request that the new and/or changed code be compiled, along with unchanged code, into a new executable version of the software application 102. For example, the computing system can generate a new version of the software application 102 as a new executable and/or deployable WAR file or JAR file. In some examples, the computing system can use tasks of a build automation tool, such as Gradle®, to build the new version of the software application 102.

At block 204, the computing system can initiate a set of parallel threads. For example, the test manager 106 can use Gradle® tasks, or tasks of another build automation tool, to dynamically set up an execution environment that includes a set of parallel threads, and different executors associated with the software application 102 in different parallel threads. In some examples, the test manager 106 can use a Java® concurrent "ExecutorService" to initialize a fixed number of parallel threads in a thread pool.

At block 206, the computing system can instantiate the database 104. For example, the test manager 106 can use Gradle® tasks, or tasks of another build automation tool, to instantiate the database 104 in memory as an in-memory database. As another example, the software application 102 can create the database 104 when the software application 102 is loaded or executed. For instance, the software application 102 can be tightly coupled to the database 104, such that the software application 102 creates the database 104 when the software application 102 executes. In some examples, the database 104 can be instantiated as a record-locking database, a table-locking database, or any other type of database.

At block 208, the computing system can dynamically distribute test cases 108 among different test sets 110. For example, the test manager 106 can identify classes 116 in the test cases 108, and can distribute the test cases 108 among the test sets 110 at a class level and/or at a method level. Each test set can be associated with a different parallel thread of the parallel threads initiated at block 204.

At block 210, the computing system can cause the test sets 110 to execute, in the parallel threads, in association with the database 104. For example, the test manager 106 can use one or more callable objects to execute the methods 118 of the different test sets 110 in association with the parallel threads and the database 104. Individual test cases 108 in the test sets 110 may succeed or fail when executed at block 210.

At block 212, the computing system can generate at least one test failure log. The at least one test failure log can include information about individual test cases 108 that fail during block 210. In some examples, the computing system can generate different test failure logs 120 that correspond to different test sets 110 associated with different parallel threads. In other examples, the computing system can generate a single test failure log that aggregates data about a set of failed test cases 108 across all the test sets 110 executed via all the parallel threads. The test failure logs 120 may identify failed test cases 108 and/or corresponding failure codes. For example, a failure code may indicate that a particular test case failed due to a missing data error in the database 104, a record-locking error in the database 104, a table-locking error in the database 104, other database conflict errors, an application error, a service error, and/or other types of errors.

At block 214, the computing system can generate at least one retry test set 122. The at least one retry test set 122 can include a set of failed test cases 108, based on the at least one test failure log generated at block 212. The computing system can also cause failed test cases 108 assigned to the at least one retry test set 122 to be re-executed at block 216.

At block 216, failed test cases 108 may be executed substantially immediately and/or at a later point in time. For example, the computing system can determine, based on a failure code for a particular failed test case, whether to immediately retry the particular failed test case or to wait to retry the particular failed test case after a predetermined delay period or after all test cases 108 have executed at least once. For instance, in some examples, the computing system can be configured to cause failed test cases 108 associated with certain failure codes, such as failure codes for record-locking errors or table-locking errors, to re-execute substantially immediately at block 216 after the computing system receives an indication that such test cases failed, instead of or in addition to adding such failed test cases 108 to the one or more test failure logs 120 at block 212. The computing system can be configured to add information about failed test cases 108 associated with other types of failure codes, such as missing data errors, to the one or more test failure logs 120 at block 212, and cause those failed test cases 108 to be re-executed on a delayed basis at block 216.

In some examples, the computing system can generate a single retry test set 122 at block 214, such that failed test cases 108 can be re-executed in sequence in a single thread at block 216. In other examples, the computing system can generate different retry test sets 122 associated with different parallel threads at block 214. The computing system can distribute the failed test cases 108 among the different retry test sets 122 at a class level or a method level, similar to initially distributing test cases 108 among multiple test sets 110 at block 208. Accordingly, the failed test cases 108 can be re-executed in parallel at block 216, similar to initially executing the full set of test cases 108 at block 210.

The computing system may also determine execution sequences for the at least one retry test set 122. For example, the computing system may use failure codes, the original structure of classes 116 and/or methods 118, machine learning models or other artificial intelligence, and/or other factors to determine an execution sequence for the test cases 108 within each retry test set 122. Such execution sequences may also indicate whether to retry individual failed test cases 108 immediately or on a delayed basis. The computing system may accordingly cause the failed test cases 108 of each retry test set 122 to be re-executed at block 216 in a corresponding determined execution sequence order.

At block 218, the computing system can aggregate results of the tests associated with the test cases 108. In some examples, the test manager 106 can receive different sets of test results associated with different test sets 110 that execute in different parallel threads, such as test results indicating that individual test cases 108 initially succeeded or failed at block 210. The test manager 106 can also receive test results associated with test cases 108 that initially failed at block 210, but were retried at least once according to block 212, block 214, and/or block 216. If initial test results indicate that a particular test case failed initially, but succeeded after being re-executed, the computing system can disregard the initial test failure and consider the test case to have succeeded.

In some situations, the aggregated test results generated at block 218, including test results for test cases 108 that have been retried at least once, may indicate that one or more test cases 108 still failed. In some examples, any test cases 108 that the aggregated test results indicate still failed may be retried at least once more at block 216. In some examples, the aggregated test results may indicate a previously unknown relationship between two or more test cases 108 that may have caused failure of those test cases 108 initially, and/or during a first re-execution attempt via one or more retry test sets. However, re-executing those test cases 108 again after aggregating the test results, for instance in sequence, may lead to the test cases 108 ultimately succeeding.

The test manager 106 can combine the different sets of test results into a single aggregated test result report, or otherwise aggregate the test results. The test manager 106 may output the single aggregated test result report, for instance in a format that is visible and/or usable by a user. In other examples, the test manager 106 may aggregate test results into any other format. The aggregated test results may indicate whether the new version of the software application 102 passed all of the test cases 108 initially and/or after re-executing at least some of the test cases 108. In some examples, if the new version of the software application 102 did not ultimately pass all of the test cases 108, the aggregated test results may identify which test cases 108 did not ultimately pass, and/or provide corresponding diagnostic details about test failures and/or errors. In some examples, after generating and/or outputting the aggregated test results, the test manager 106 may discard the different individual sets of test results that were generated in association with different parallel threads, test sets 110, and/or retry test sets 122.

In some examples, at the conclusion of testing, the computing system can also de-allocate memory or other computing resources associated with the software application 102 and the database 104. For example, if server memory had been allocated to execute eight test sets 110 in association with the database 104, the allocated memory can be deallocated and/or cleaned up to prepare the server for a subsequent round of testing.

Process 200 can be used to determine whether a version of the software application 102 passes all of the test cases 108. If the version of the software application 102 does not pass all the test cases 108, the version of the software application 102 can be re-coded or otherwise changed until it does pass all of the test cases 108. However, if the version of the software application 102 does ultimately pass all the test cases 108, for instance after re-executing some test cases 108 that initially failed, passing all the test cases 108 may indicate that the version of the software application 102 is suitable to deploy in other environments, such as other testing environments, in other development environments, and/or in production environments.

In some examples, process 200 can be used for local testing of the software application 102 based on changes made by a single developer, and/or for global testing of the software application based on changes made by multiple developers, as discussed further below with respect to FIG. 3. In both situations, by distributing test cases 108 among different test sets 110 and executing the test sets 110 in parallel, overall testing times can be reduced relative to executing the test cases 108 in sequence. Additionally, by maintaining the test failure logs 120 and causing failed test cases 108 to be re-executed, errors and test failures that might otherwise cause the testing to fail overall can be reduced and/or eliminated.

Figure 3:
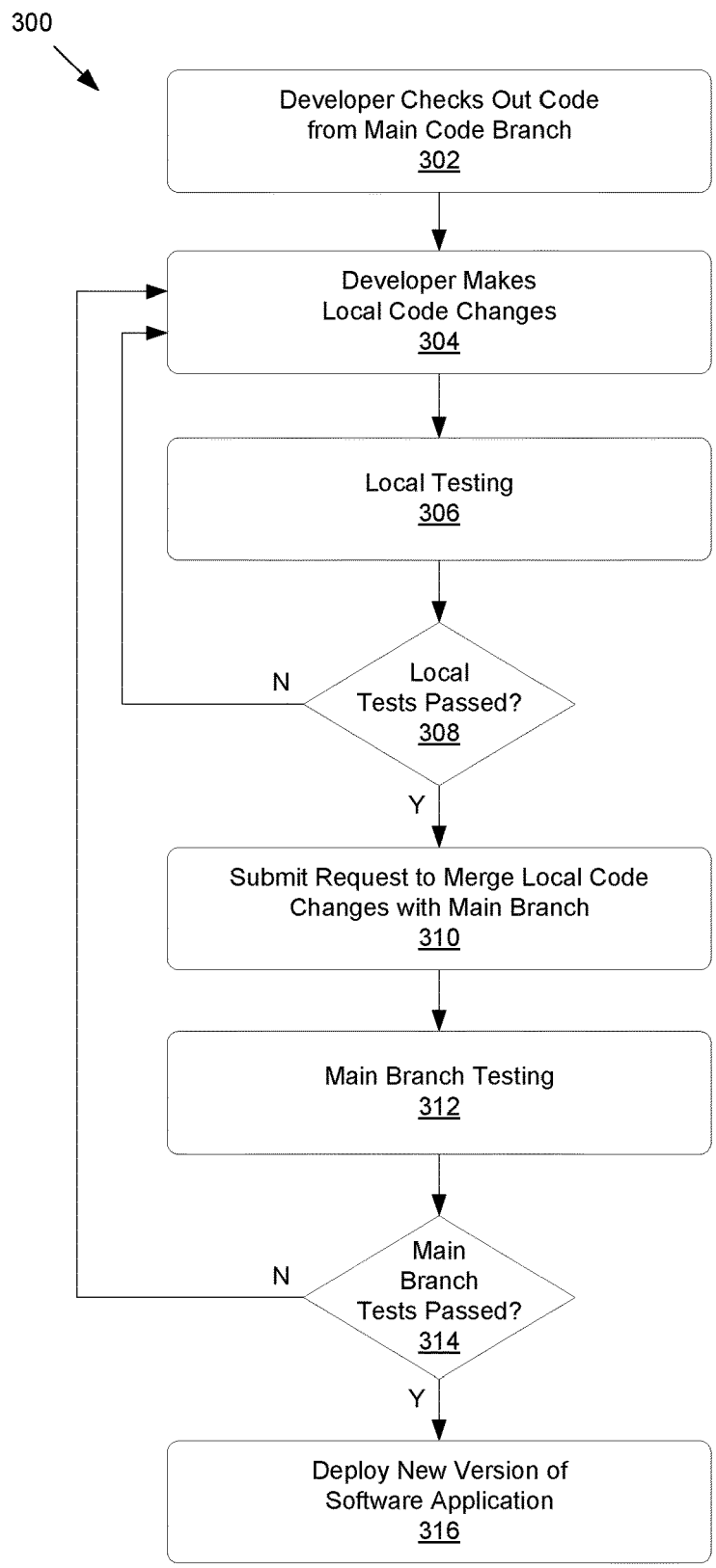
FIG. 3 shows a flowchart of a second example process for generating and testing the software application using parallel threads.

FIG. 3 shows a flowchart of a second example process 300 for generating and testing the software application 102 using parallel threads. At block 302, a computing device associated with a software developer can check out source code associated with the software application 102 and/or the test cases 108 from a main code branch. For example, the source code can be stored in a main code branch at a central repository available to a team of software developers. The computing device may receive a "check out" command from the software developer. Such a "check out" command, or other command, can cause the computing device to retrieve a copy of the source code from the central repository, and thereby check out the source code from the main code branch. Accordingly, at block 302, a computing device associated with a particular software developer can transfer a copy of the source code from the central repository and thus check out a copy of the source code from the main code branch.

At block 304, the computing device can make changes to the source code associated with the software application 102 and/or the test cases 108 locally. The computing device can display the source code within a text editor, an integrated development environment (IDE), or other programming environment. The software developer can type new code and/or input other commands via the text editor, IDE, or other programming environment, which can cause the computing device to edit the source code checked out at block 302.

As an example, input provided by the software developer can cause the computing device to add new code or change existing code associated with the software application. As another example, input provided by the software developer can cause the computing device to add or change configuration files or other settings associated with the software application 102. As yet another example, input provided by the software developer can cause the computing device to add edit code for test cases 108, including adding one or more new test cases 108, removing one or more test cases 108, and/or changing source code for one or more test cases 108.

At block 306, the computing device can initiate local testing of the software application 102 based on the local changes to the source code associated with the software application 102 and/or the test cases 108. The local testing can include the operations of example process 200 shown and described with respect to FIG. 2. For instance, the computing device, or a separate centralized computing device, can build a new version of the software application based on the local code changes associated with the software application 102 and/or the test cases 108 made at block 304, initiate parallel threads, instantiate the database 104, distribute test cases 108 among different test sets 110 corresponding to different parallel threads, execute the test sets 110 in the parallel threads in association with the new version of the software application 102, re-execute any test cases 108 that initially failed, and output an aggregated test result report based on test results corresponding to the different test sets 110 and retry test sets 122.

At block 308, the system can determine whether the new version of the software application 102, built and tested based on local changes to the source code, ultimately passed all of the test cases 108. If the aggregated test result report indicates that the new version of the software application 102 did not ultimately pass all of the test cases 108 executed locally at block 306 (Block 308-No), the software developer can provide input that causes the computing device to make further changes to the source code locally at block 304, and the computing device can retry local testing at block 306. However, if the aggregated test result report indicates that the new version of the software application 102 did ultimately pass all of the test cases 108 executed locally (Block 308-Yes), the computing device can submit a merge request at block 310. For example, based on the test result report indicating that local testing has succeeded, the software developer can input a command that causes the computing device to submit a merge request.

The merge request submitted at block 310 can be a request to combine the local code changes associated with the software application 102 and/or the test cases 108, made at block 304, with the main code branch, such that the code changes become part of the main code branch, override previously existing code in the main code branch, and can be checked out from the main code branch by computing devices associated with other software developers. Although the local code changes may have passed local testing, the main code branch may have changed between blocks 302 and 310, for instance if other code changes made by other software developers have been merged into the main branch such that the local changes made at block 304 to code checked out from the main code branch at block 302 would conflict with more recent changes to the main code branch. To determine if the local code changes would conflict with any other changes made to the main code branch, main branch testing can be performed at block 312.

In some examples, the merge request submitted at block 310 may initiate a code review process by which one or more other software developers review the local code changes associated with the software application 102 and/or the test cases 108 made at block 304. In these examples, if the other software developers do not approve local code changes made by a software developer as part of the code review process, the software developer can return to make further changes to the source code locally via the computing device at block 304. However, if the other software developers do approve the local code changes as part of the code review process, the main branch testing can be performed at block 312.

The main branch testing performed at block 312 can include the operations of example process 200 shown and described with respect to FIG. 2. For instance, a centralized computing device can build a new version of the software application based on the local code changes associated with the software application 102 and/or the test cases 108 made at block 304, as well as the most recent version of the main code branch. The centralized computing device can also initiate parallel threads, instantiate the database 104, distribute test cases 108 among different test sets 110 corresponding to different parallel threads, execute the test sets 110 in the parallel threads in association with the new version of the software application 102, re-execute any test cases 108 that initially failed, and output an aggregated test result report based on test results corresponding to the different test sets 110 and retry test sets 122.

At block 314, the system can determine whether the new version of the software application 102, built based on a combination of the local changes to the source code associated with the software application 102 and/or the test cases 108 and the most recent version of the source code in the main branch, ultimately passed all of the test cases 108. If the aggregated test result report indicates that the new version of the software application 102 did not ultimately pass all of the test cases 108 executed at block 312 (Block 314-No), the software developer can provide input that causes the computing device to make further local changes to the source code at block 304. The computing device can then cause local testing to be retried at block 306 and/or main branch testing to be retried at block 312. However, if the aggregated test result report indicates that the new version of the software application 102 built during main branch testing at block 312 did ultimately pass all of the test cases 108 executed at block 312 (Block 314-Yes), the new version of the software application 102 built during block 312 can be deployed in other environments at block 316. For example, at block 316, the new version of the software application 102 can be deployed in other testing environments, in other development environments, and/or in production environments.

Process 300 can be used to determine whether a version of software application passes all of the test cases 108 at a local level and/or when merged into a main code branch. In both situations, by distributing test cases 108 among different test sets 110 and executing the test sets 110 in parallel, overall testing times can be reduced relative to executing the test cases 108 in sequence. Additionally, by maintaining the test failure logs 120 and causing failed test cases 108 to be re-executed, errors and test failures that might otherwise cause the testing to fail overall can be reduced and/or eliminated. Process 300 can be performed by a computing device associated with a single developer and/or by a central server or other computing device associated with multiple developers, an example of which is shown and described below with respect to FIG. 4.

Figure 4:
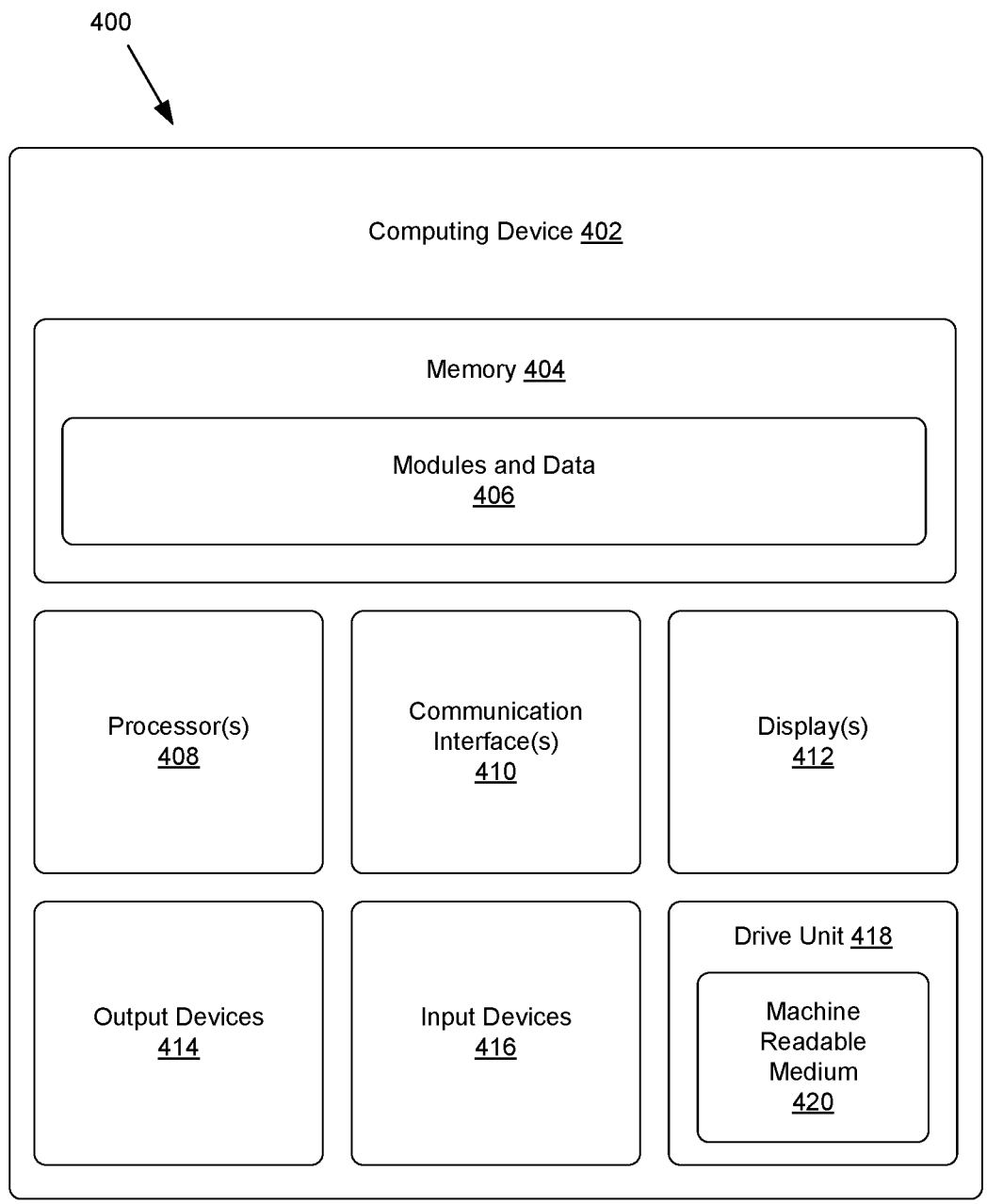
FIG. 4 shows an example system architecture for a computing device.

FIG. 4 shows an example system architecture 400 for a computing device 402 associated with the test manager 106 and/or software application 102 described herein. The computing device 402 can be a server, computer, or other type of computing device that executes the test manager 106, and/or executes instances of the software application 102 and/or test sets 110 in parallel in association with the database 104.

The computing device 402 can include memory 404. In various examples, the memory 404 can include system memory, which may be volatile (such as RAM), non-volatile (such as ROM, flash memory, etc.) or some combination of the two. The memory 404 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 402. Any such non-transitory computer-readable media may be part of the computing device 402.

The memory 404 can store modules and data 406. The modules and data 406 can include data associated with the test manager 106, the software application 102, the database 104, the test cases 108, the test sets 110, the test failure logs 120, the retry test sets 122, and/or other data. The modules and data 406 can also include any other modules and/or data that can be utilized by the computing device 402 to perform or enable performing any other actions. Such other modules and data can include a platform, operating system, and applications, and data utilized by the platform, operating system, and applications.

As discussed above, the test manager 106 may cause portions of the memory 404 to be allocated to different parallel threads. For instance, the test manager 106 may allocate portions of an overall amount of the memory 404 to different parallel threads, and cause different instances of the software application 102 to execute in the different parallel threads.

The computing device 402 can also have processor(s) 408, communication interfaces 410, displays 412, output devices 414, input devices 416, and/or a drive unit 418 including a machine readable medium 420.

In various examples, the processor(s) 408 can be a central processing unit (CPU), a graphics processing unit (GPU), both a CPU and a GPU, or any other type of processing unit. Each of the one or more processor(s) 408 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 408 may also be responsible for executing computer applications stored in the memory 404, which can be associated with common types of volatile (RAM) and/or nonvolatile (ROM) memory.

The communication interfaces 410 can include transceivers, modems, interfaces, antennas, telephone connections, and/or other components that can transmit and/or receive data over networks, telephone lines, or other connections.

The display 412 can be a liquid crystal display or any other type of display commonly used in computing devices. For example, a display 412 may be a touch-sensitive display screen, and can then also act as an input device or keypad, such as for providing a soft-key keyboard, navigation buttons, or any other type of input.

The output devices 414 can include any sort of output devices known in the art, such as a display 412, speakers, a vibrating mechanism, and/or a tactile feedback mechanism. Output devices 414 can also include ports for one or more peripheral devices, such as headphones, peripheral speakers, and/or a peripheral display.

The input devices 416 can include any sort of input devices known in the art. For example, input devices 416 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 420 can store one or more sets of instructions, such as software or firmware, that embodies any one or more of the methodologies or functions described herein. The instructions can also reside, completely or at least partially, within the memory 404, processor(s) 408, and/or communication interface(s) 410 during execution thereof by the computing device 402. The memory 404 and the processor(s) 408 also can constitute machine readable media 420.

The computing device 402 can execute testing of a software application more quickly and/or with fewer computing resources than other systems. For example, by executing the test manager 106 to distribute test cases 108 among different test sets 110 that can be executed in parallel, the test cases 108 can be executed more quickly than the test cases 108 could be executed in sequence. As a non-limiting example, although the computing device 402 might take up to two hours to execute a full set of test cases in sequence, executing different test sets 110 simultaneously in parallel on the computing device 402 may allow the full set of test cases 108 to complete in 30 minutes or less. Developers can thus be notified whether their code changes pass the full set of test cases 108 more quickly, and allow code changes that have passed the full set of test case 108 to be merged into a main code branch more quickly.

Similarly, executing test cases 108 in parallel can also reduce overall usage of computing resources on the computing device 402 when multiple new builds of a software application are tested. As a non-limiting example, although the computing device 402 might take up to two hours to execute a full set of test cases in sequence, and thus take up to 7200 minutes to test sixty different builds in a day, reducing the testing for each build down to 30 minutes or less by executing different test sets 110 simultaneously in parallel may allow the computing device 402 to execute the full set of test cases 108 for all sixty builds in only 1800 minutes.

Moreover, by tracking failures of test cases 108 in test failure logs 120, and causing any failed test cases 108 to be re-executed at later times at which the test cases 108 may be less likely to fail again, test failures or errors that might prolong testing and/or cause testing to fail overall can be reduced and/or eliminated.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
    distributing, by one or more processors, a group of test cases among different test sets, wherein the group of test cases is configured to test interactions between a software application and a database;
    executing, by the one or more processors, the different test sets in parallel;
    identifying, by the one or more processors, a set of failed test cases comprising test cases that:
        were executed during execution of the different test sets in parallel, and
        produced test results indicating that the software application failed to pass the test cases;
    determining, by the one or more processors, causes of failures of the test cases in the set of failed test cases;
    identifying, by the one or more processors, failure codes that correspond to the causes of the failures of the test cases in the set of failed test cases;
    determining, by the one or more processors, and based on the failure codes, an execution order for re-execution of the test cases in the set of failed test cases; and
    re-executing, by the one or more processors, the test cases in the set of failed test cases based on the execution order.

2. The computer-implemented method of claim 1, wherein:
    executing the different test sets in parallel is associated with a first likelihood of the causes of the failures, and
    re-executing the test cases in the set of failed test cases based on the execution order is associated with a second likelihood, less than the first likelihood, of the causes of the failures reoccurring during re-execution of the test cases in the set of failed test cases.

3. The computer-implemented method of claim 1, wherein:
    the execution order is determined based at least in part by a machine learning model, and
    the machine learning model is trained, based on historical data indicating successful re-executions of historical failed test cases associated with the failure codes, to determine an arrangement of the execution order that is predicted to reduce likelihoods of the causes of the failures reoccurring during re-execution of the test cases in the set of failed test cases.

4. The computer-implemented method of claim 1, wherein:
    the set of failed test cases comprises:
        one or more first test cases associated with a first failure code of the failure codes, and
        one or more second test cases associated with a second failure code of the failure codes, and
    the execution order causes the one or more processors to:
        re-execute the one or more first test cases substantially immediately following failure of the one or more first test cases, based on the first failure code, and
        re-execute the one or more second test cases after a period of time following failure of the one or more second test cases, based on the second failure code.

5. The computer-implemented method of claim 4, wherein:
    the first failure code indicates that database locking errors caused the one or more first test cases to fail, and
    the execution order is arranged, based on the first failure code, to cause re-execution of the one or more first test cases substantially immediately following the failure of the one or more first test cases.

6. The computer-implemented method of claim 4, wherein:
    the second failure code indicates that missing data errors caused the one or more second test cases to fail, and
    the execution order is arranged, based on the second failure code, to delay re-execution of the one or more second test cases for the period of time, following the failure of the one or more second test cases, to reduce likelihoods of the missing data errors re-occurring during re-execution of the one or more second test cases.

7. The computer-implemented method of claim 1, wherein re-executing the test cases in the set of failed test cases based on the execution order comprises:
    distributing, by the one or more processors, the test cases in the set of failed test cases among different retry test sets; and
    executing, by the one or more processors, the different retry test sets in parallel.

8. The computer-implemented method of claim 7, wherein determining the execution order comprises determining different execution orders associated with the different retry test sets.

9. The computer-implemented method of claim 1, wherein:
    the group of test cases was created based on an expectation of individual test cases, of the group of test cases, being executed in a sequential execution order, and
    the failures of one or more of the test cases, in the set of failed test cases, are caused at least in part by executing the different test sets in parallel, rather than executing the individual test cases in the sequential execution order.

10. The computer-implemented method of claim 1, further comprising:
    collecting, by the one or more processors, final test results associated with the group of test cases, wherein the final test results indicate whether individual test cases succeeded during at least one of:
        execution of the different test sets in parallel, or
        re-execution of the set of failed test cases; and
    combining, by the one or more processors, the final test results into an aggregated test result report.

11. A computing device, comprising:
    one or more processors; and
    memory storing computer-executable instructions that, when executed by the one or more processors, cause the one or more processors to perform operations comprising:
        distributing a group of test cases, configured to test interactions between a software application and a database, among at least a first test set and a second test set;
        executing the first test set and the second test set in parallel;

identifying a set of failed test cases comprising test cases that:
were executed during execution of the first test set and the second test set in parallel, and
produced test results indicating that the software application failed to pass the test cases;
determining causes of failures of the test cases in the set of failed test cases;
identifying failure codes that correspond to the causes of the failures of the test cases in the set of failed test cases;
determining, based on the failure codes, an execution order for re-execution of the test cases in the set of failed test cases; and
re-executing the test cases in the set of failed test cases based on the execution order.

12. The computing device of claim 11, wherein the execution order is determined to reduce likelihoods of the causes of the failures, associated with the failure codes, reoccurring during the re-execution of the test cases in the set of failed test cases.

13. The computing device of claim 11, wherein:
the set of failed test cases comprises:
one or more first test cases associated with a first failure code of the failure codes, and
one or more second test cases associated with a second failure code of the failure codes, and
the execution order causes the one or more processors to:
re-execute the one or more first test cases substantially immediately following failure of the one or more first test cases, based on the first failure code, and
re-execute the one or more second test cases after a period of time following failure of the one or more second test cases, based on the second failure code.

14. The computing device of claim 11, wherein re-executing the test cases in the set of failed test cases based on the execution order comprises:
distributing the test cases, in the set of failed test cases, among different retry test sets; and
executing the different retry test sets in parallel.

15. The computing device of claim 11, wherein:
the group of test cases was created based on an expectation of individual test cases, of the group of test cases, being executed in a sequential execution order, and
the failures of one or more of the test cases, in the set of failed test cases, are caused at least in part by executing the first test set and the second test set in parallel, rather than executing the individual test cases in the sequential execution order.

16. One or more non-transitory computer-readable media storing computer-executable instructions that, when executed by one or more processors, cause the one or more processors to perform operations comprising:
distributing a group of test cases, configured to test interactions between a software application and a database, among different test sets;
executing the different test sets in parallel;
identifying a set of failed test cases comprising test cases that:
were executed during execution of the different test sets in parallel, and
produced test results indicating that the software application failed to pass the test cases;
determining causes of failures of the test cases in the set of failed test cases;
identifying failure codes that correspond to the causes of the failures of the test cases in the set of failed test cases;
determining, based on the failure codes, an execution order for re-execution of the test cases in the set of failed test cases; and
re-executing the test cases in the set of failed test cases based on the execution order.

17. The one or more non-transitory computer-readable media of claim 16, wherein the execution order is determined to reduce likelihoods of the causes of the failures, associated with the failure codes, reoccurring during the re-execution of the test cases in the set of failed test cases.

18. The one or more non-transitory computer-readable media of claim 16, wherein:
the set of failed test cases comprises:
one or more first test cases associated with a first failure code of the failure codes, and
one or more second test cases associated with a second failure code of the failure codes, and
the execution order causes the one or more processors to:
re-execute the one or more first test cases substantially immediately following failure of the one or more first test cases, based on the first failure code, and
re-execute the one or more second test cases after a period of time following failure of the one or more second test cases, based on the second failure code.

19. The one or more non-transitory computer-readable media of claim 16, wherein re-executing the test cases in the set of failed test cases based on the execution order comprises:
distributing the test cases in the set of failed test cases among different retry test sets; and
executing the different retry test sets in parallel.

20. A system comprising:
means for distributing a group of test cases, configured to test interactions between a software application and a database, among different test sets;
means for executing the different test sets in parallel;
means for identifying a set of failed test cases comprising test cases that:
were executed during execution of the different test sets in parallel, and
produced test results indicating that the software application failed to pass the test cases;
means for determining causes of failures of the test cases in the set of failed test cases;
means for identifying failure codes that correspond to the causes of the failures of the test cases in the set of failed test cases;
means for determining, based on the failure codes, an execution order for re-execution of the test cases in the set of failed test cases; and
means for re-executing the test cases in the set of failed test cases based on the execution order.

* * * * *